United States Patent [19]

Wick et al.

[11] 4,106,036

[45] Aug. 8, 1978

[54] ACCESSORY UNIT FOR PHOTOGRAPHIC APPARATUS

[75] Inventors: Richard Wick; Otto Stemme, both of Munich; Peter Lermann, Narring; Karl-Heinz Schultheiss, Taufkirchen, all of Fed. Rep. of Germany

[73] Assignee: AGFA-Gevaert AG, Leverkusen, Fed. Rep. of Germany

[21] Appl. No.: 797,795

[22] Filed: May 17, 1977

[30] Foreign Application Priority Data

May 20, 1976 [DE] Fed. Rep. of Germany ....... 2622604

[51] Int. Cl.² .................. G03B 17/50; G03B 15/02
[52] U.S. Cl. ................................. 354/83; 354/126; 354/288; 354/295
[58] Field of Search ............... 354/83, 126, 202, 288, 354/295

[56] References Cited

U.S. PATENT DOCUMENTS

| 2,839,668 | 6/1958 | Mills ............................ 354/126 X |
| 3,374,719 | 3/1968 | Hortor et al. ..................... 354/126 |
| 3,967,303 | 6/1976 | Fischer et al. ................ 354/126 X |

Primary Examiner—Michael L. Gellner
Attorney, Agent, or Firm—Michael J. Striker

[57] ABSTRACT

An accessory unit, for example an electronic flash unit, for use with photographic apparatus has a housing provided with one or more connecting elements for detachably connecting the unit to the apparatus. The housing has a through-going, essentially slot-shaped passage through which self-developing film sheets ejected from the apparatus can pass, or through which a strap or other retaining element of the camera can extend which holds the unit adjacent to the camera even when the unit is not in operative position, i.e. when the unit is detached from the photographic apparatus.

19 Claims, 10 Drawing Figures

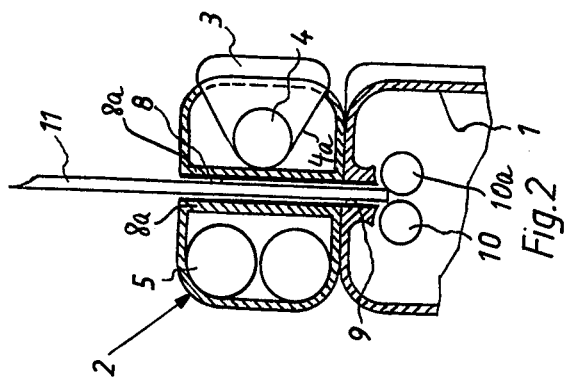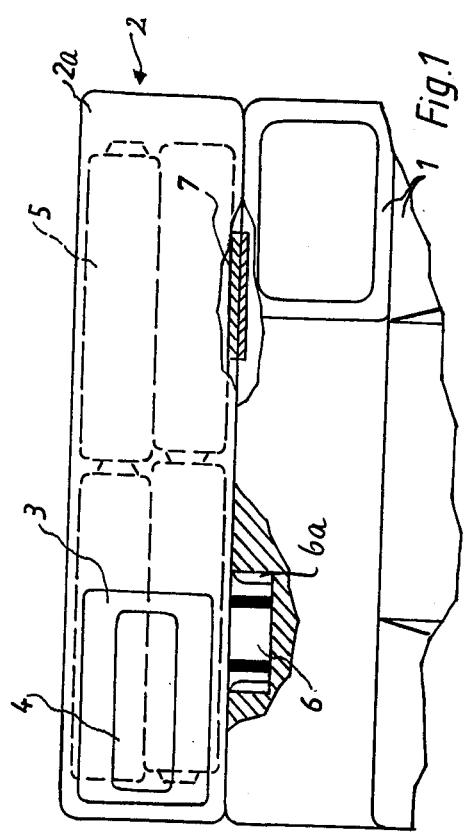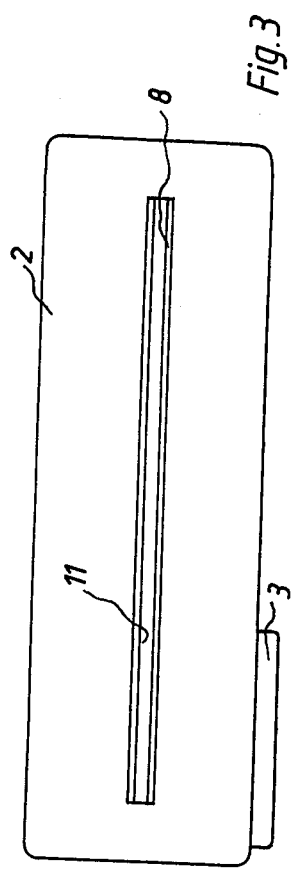

ACCESSORY UNIT FOR PHOTOGRAPHIC APPARATUS

BACKGROUND OF THE INVENTION

This invention relates to photographic apparatus and to an accessory unit for use with such apparatus.

Such accessory units may, for example, be in form of electronic flash units which can be installed in or on the photographic apparatus (e.g. a still camera); they could also be in form of exposure meters or, in fact, in form of any of the various known accessory units.

Often, such units are relatively bulky and interfere with the intended simple operation of the photographic apparatus by a user, making such operation undesirably difficult.

SUMMARY OF THE INVENTION

It is an object of the present invention to overcome the prior-art disadvantages.

A more particular object is to provide an accessory unit for use with photographic apparatus, which unit is accommodated in a simple manner to the internal or external configuration of the photographic apparatus.

Another object of the invention is to provide an accessory unit of the type in question which provides for optimum utilization of space but does not interfere with the functioning of any components of the photographic apparatus, nor make the operation of the apparatus more difficult.

A concomitant object is to provide such a unit which will perform at least one additional function over and above its intended primary function, e.g. beyond operating as a flash unit.

In keeping with these objects, and with others which will become apparent hereafter, one aspect of the invention resides in an accessory unit for use with a photographic apparatus, e.g. a still camera. Briefly stated, such unit may comprise a housing, means for connecting the housing to a photographic apparatus, and at least one aperture in the housing for passage therethrough (i.e. through the aperture and thereby through the housing) of a part associated with the photographic apparatus.

The part may be an exposed, self-developing film sheet if the apparatus is of the self-developing type in which such exposed sheets are ejected from the apparatus upon completion of the exposure. The part could also be another element, e.g. a camera strap or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a fragmentary, broken-away front view showing a unit according to one embodiment of the invention installed in a camera;

FIG. 2 is a fragmentary vertical transverse section through the embodiment in FIG. 1;

FIG. 3 is a top-plan view of the unit in FIG. 1;

DESCRIPTION OF THE PREFERRED EMBODIMENTS

Figure 4:
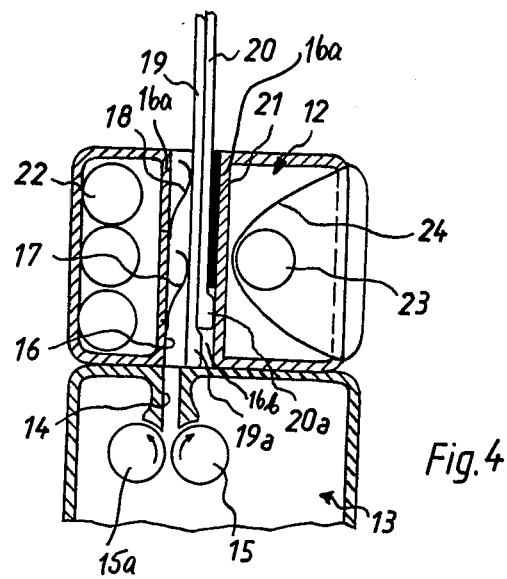
FIG. 4 is a fragmentary vertical transverse sectional view analogous to FIG. 2, but illustrating a further embodiment of the invention.

Referring now to the drawing it will be noted that FIGS. 1–3 illustrate a first embodiment of the invention. Reference numeral 1 designates the housing of a photographic apparatus (here shown as a known-per-se self-developing type of camera) on which an accessory unit 2 according to the invention is mounted. The unit 2 is here shown as an electronic flash unit (but could be of a different character) having a housing 2a provided with a flash opening (or window) 3 behind which is located an electronic flash tube 4 (known per se) with its associated reflector 4a. The unit 2 has a source of electrical energy for the flash tube, here shown in form of dry cells 5. The housing 2a has a mounting foot 6 which is receivable in a mounting shoe 6a of the camera housing 1; the electrical connection between the camera and the unit 2, i.e. the connection via which the signal triggering the operation of the flash tube 4 is transmitted, can be established in known manner by interengagement of the elements 6, 6a with one another.

Camera housing 1 and unit 2 are provided with an additional releasable connection, here in form of magnet elements 7. The element on unit 2 may be a permanent magnet and the one on the camera may be a member of magnetizable material, or vice versa. The connection 7 is spaced from elements 6, 6a to assure that the unit 2 will always be properly and timely aligned with reference to the camera, since it is then secured at two spaced-apart locations.

In accordance with the invention the housing of unit 2 is provided with an upright passage 8 which is bounded by lateral walls 8a. The camera, being of the self-developing type, has in its interior a pair of (diagrammatically shown) transporting rollers 10, 10a which are located below an outlet slot 9 in the upper wall of the camera housing 1. Upon exposure of one of the film sheets in the camera, such film sheet 11 is transported in known manner into the nip between the rollers 10, 10a one or both of which are driven. The rollers 10, 10a expel the film sheet 11 through the slot 9; since the passage 8 is aligned with the slot 9 when the unit 2 is installed on housing 1, the film sheet 11 travels through the passage 8 and projects upwardly beyond the unit 2 so that a user can grip and extract it.

The embodiment of FIG. 4 should be understood to be identical to the one in FIGS. 1–3 (and to cooperate with the same type of camera), except for the differences explained hereafter.

In FIG. 4 the accessory unit 12 is again shown as an electronic flash unit which is mounted on a camera 13 of the self-developing type. Camera 13 has a film-sheet outlet slot 14 and below it a pair of nip rollers 15, 15a which eject film sheets through the slot 14. Unit 12 has dry cells 22 and a flash tube 23 with reflector 24.

The unit 12 has a passage 16 which is bounded by walls 16a and, which in the operative position (as shown) of the unit 2, is aligned with the slot 14. Laterally of the passage 16 the housing of unit 12 is formed with a storage space 16b that is open to (and forms a lateral extension of) the passage 16.

When the lower (trailing) end of the respective film sheet passes upwardly beyond the nip of the rollers 15, 15a and out of slot 14, leaf springs 17, 18 (other means could be used in their place) which are mounted on that wall 16a which bounds passage 16, push the film sheet into the storage space 16b. In FIG. 4, two such film sheets 19, 20 are shown located in the area 16b. That wall 16a which bounds the space 16b is advantageously provided with a layer 21 of friction material (e.g. felt, rubber, synthetic plastic material) which aids in retaining the film sheets 19, 20 against slipping out of the space 16b (by cooperation with the pressure exerted by springs 17, 18). The layer 21 extends partly or all the way to the lower end of space 16b. If it terminates short of this lower end (as shown) then the lower edge of layer 21 serves as an abutment for the pouch 20a of the film sheet 20 (i.e. the film sheet which is the first and enter the space 16b); such pouches serve to trap any excess of the developer which has been squeezed by the rollers 15, 15a out of a storage pouch at the leading end of the respective film sheet and spread over the exposure area of the same. The lower end of the pouch 20a in turn then serves as an abutment for the pouch 19a of the next-to-enter film sheet 19.

The embodiment of FIG. 4 thus provides for self-storage of already exposed film sheets in the accessory unit 12 without the camera user having to interrupt his further picture-taking activities (to remove the previous film sheets) and without any interference by the exposed film sheets in the subsequent expulsion of additional film sheets. The space 16b may, of course, be made large enough to store one, two (as shown) or more exposed film sheets and their deflection into this space 16b by the springs 17, 18 immediately frees the passage 16 for the entry of the next-following film sheet.

Figure 5:
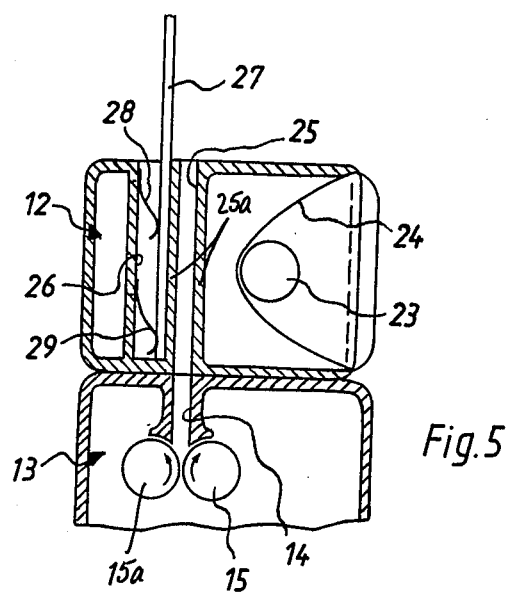
FIG. 5 is a view similar to the one in FIG. 4 but showing another embodiment.

The embodiment of FIG. 5 is identical with the one in FIG. 4, except for the differences noted hereafter; hence, like reference numerals have been used to designate like elements.

In FIG. 5 the storage space for exposed film sheets is in form of a recess or slot-shaped pocket 26 which extends parallel to the passage 25. Two leaf springs 28 and 29 in the pocket 26 press against inserted exposed film sheets (e.g. 27) to prevent them from falling out of the pocket.

The passage 25, bounded by walls 25a, is here shaped in the same manner as the passage 8 of FIG. 2, i.e. it is a through-passage which does not have the lateral enlargement that forms the space 16b in FIG. 4. Of course, in FIG. 5 the user must withdraw each film sheet (e.g. 27) as its upper end portion projects from the upper end of passage 25 and then insert the film sheet in the pocket 26.

Figure 6:
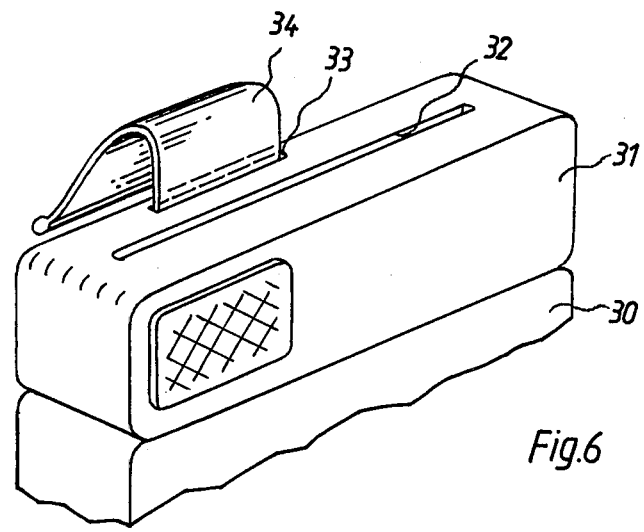
FIG. 6 is a fragmentary front perspective illustration of an additional embodiment.
Figure 7:
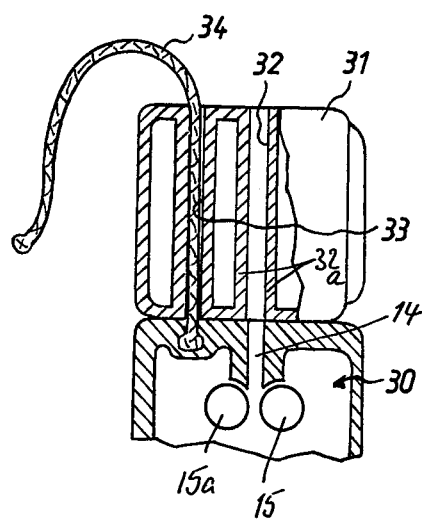
FIG. 7 is a fragmentary, vertical transverse section through the embodiment of FIG. 6.

FIGS. 6 and 7 show an embodiment in which the accessory unit is again constituted as an electronic flash unit 31 that is detachably connectable (e.g. in the manner described with reference to FIG. 1) to a self-developing type camera 30. Like reference numerals identify like elments as in FIGS. 4 and 5.

The unit 31 has a passage 32 which is bounded by walls 32a and corresponds to (and has the same purpose as) the passage 25 of FIG. 4. In addition, unit 31 has a further passage 33 which is spaced from the passage 32 and through which a part of camera 30 can be extended. In the illustrated embodiment this part is constituted by a strap 34 which is secured (permanently or releasably) to the camera 30. Of course, an element other than a strap (for example a metal or plastic strip of, e.g. semi-rigid type, a wire or the like) could also be used.

In this embodiment the unit 31 is shown mounted on the camera 30 in operative position (connecting means corresponding to those in FIG. 1 may be provided). If, however, the unit is not to be used, then the connecting means are released and the unit 31 is slightly pulled up along the strap 34 on which it then hangs in readiness for re-attachment but without any danger that it might become lost. The user therefore has no need to worry where to store the unit 31 until he needs it again.

Figure 8:
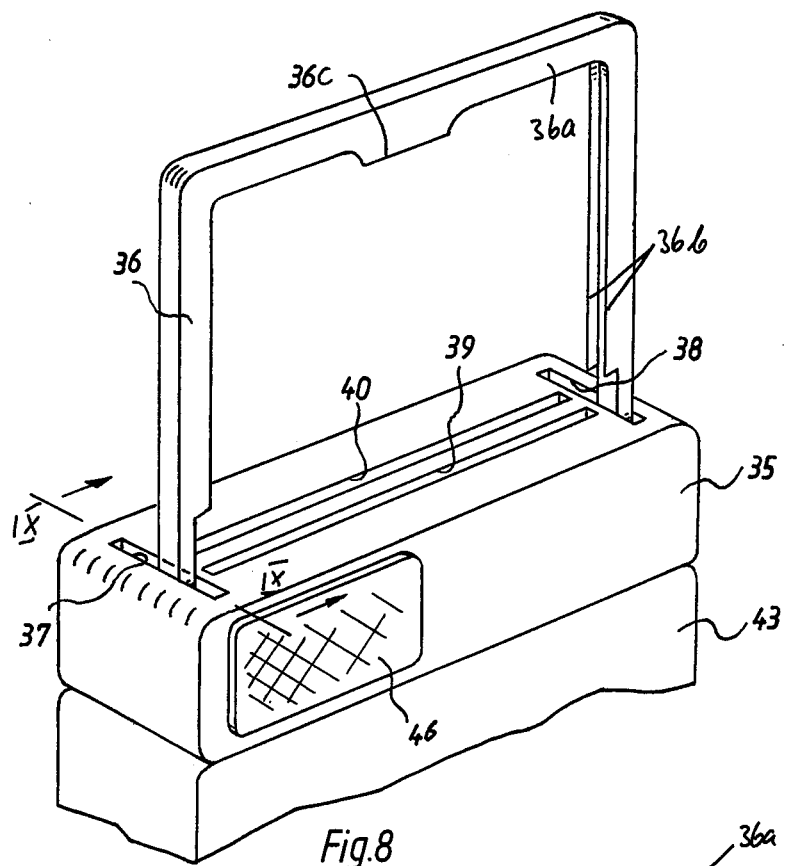
FIG. 8 is a fragmentary front perspective of yet another embodiment of the invention.
Figure 10:
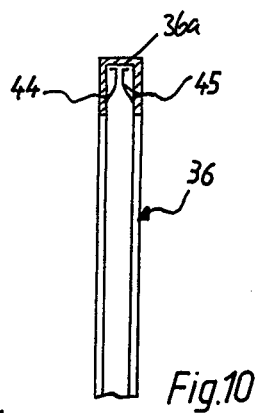
FIG. 10 is a fragmentary vertical section through an element of the embodiment shown in FIGS. 8 and 9.
Figure 9:
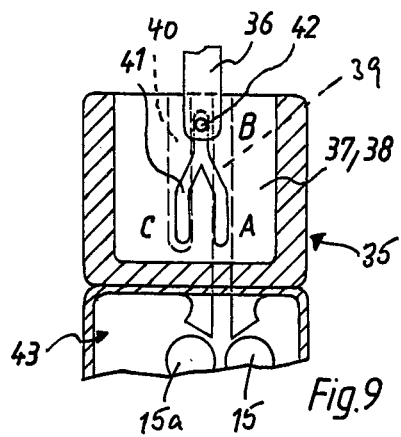
FIG. 9 is a fragmentary vertical transverse section through the embodiment of FIG. 8, on line IX—IX thereof.

Finally, FIGS. 8-10 show an embodiment in which an accessory unit (again in form of an electronic flash unit 35) is shown connected (e.g. in the same manner as in FIG. 1) with a camera 43 corresponding to the camera 1 of FIG. 1.

The unit 35 is provided with a passage 39 for the ejected film sheets (only the upper end of the passage is shown in FIG. 8) and, laterally thereof, with a slot-shaped storage pocket 40 for exposed film sheets. Adjacent the ends of the passage 39 and pocket 40 the unit 35 is also provided with two recesses 37 and 38 of substantially slot-shaped configuration. A generally frame-shaped receiver 36 (resembling an inverted U) has lateral arms the lower end portions of which are received in the recesses 37 and 38, respectively. Each of the recesses 37, 38 is provided (e.g. in a wall thereof) with a bifurcated guide groove 41; each of the lower end portions of the arms on receiver 36 carries a pin or projection 42 which slides in the respective guide groove 41.

The receiver 36 can be moved up and down with reference to the housing of the unit 36, and in so doing the pins 42 can be displaced in their guide grooves 41 between positions A, B and C, respectively (FIG. 9). The lateral arms and the upper cross-piece 36a are provided with grooves (bounded by the portions 36b shown in FIG. 8) into which an exposed film sheet (not shown) expelled from camera 43 can enter. The groove in the cross-piece 36a has springs 44, 45 (or other suitable elements) mounted in it to engage the upper (leading) edge of a film sheet and retain the sheet in the receiver.

When the receiver 36 is pushed down so that its pins 42 are at the locations A, and a film sheet is expelled from camera 43, the upper edge of the sheet will enter between the springs 44, 45 and be held by the same; its lateral edges will be located between the portions 36b of the lateral arms. Thereafter the user pulls receiver 36 upwards until pins 42 are located at position B and the lower (trailing) edge of the film sheet is located above the upper outlet end of passage 39. The user then tilts the receiver 36 (by inclining its upper end in direction towards the flash window 46 of the unit 35) and pushes the receiver down again so that the pins 42 slide down in the groove 41 until they reach the position C. During this movement the lower portion of the film sheet enters the storage pocket 40 where it is engaged (e.g. by non-illustrated springs). By pressing upon the portions 36c of the cross-member 36a (squeezing them together) the user causes the upper ends (in FIG. 10) of the springs 44 and 45 to move apart so that they release the film sheet which remains in storage pocket 40 as the user pulls the receiver up and then pushes it down again so that the pins 42 return to position A.

Each film sheet is thus reliably guided by the receiver 36 as soon as it is ejected from the camera and there is no danger that it might accidentally fall out and become damaged or soiled.

In all embodiments the arrangement may be such that the nip rollers eject each film sheet completely through the outlet slot of the camera, or else the respective film sheet must be slightly pulled up by the user (at its upper end which by this time projects from the accessory unit) until its lower end enters into the passage of the unit. In FIGS. 8-10 the receiver 36 must, of course, have sufficient freedom of vertical movement so that the lower end of a film sheet held by it can move above the upper end of passage 36 before the receiver 36 is tilted to insert the film sheet into the pocket 40. For example, the branch A of groove 41 may be made of a length (greater than the branch C) sufficient to permit such movement. Another possibility would be to provide auxiliary nip rollers within the housing of the accessory unit and which can be coupled with the nip rollers of the camera to be driven thereby when the accessory unit is put in place in the camera. These auxiliary nip rollers would then receive the film sheet from the rollers of the camera and feed it into the receiver. It is also possible to make the length of grooves 41 greater than the height of unit 35, e.g. to have them extend into upstanding brackets or portions on the housing of the unit 35. If desired, the slots 37, 38 and at least the branch A of groove 41 could be provided in the housing of the camera itself.

It is advantageous in all embodiments if the walls bounding the passage for the ejected film sheets subdivide the interior of the accessory unit to form a first section which accommodates the batteries or other source of electrical energy (e.g. inclusive of capacitors), and a second section which accommodates the flash tube and the other electronic-flash components associated with it.

An advantage of the embodiment in FIGS. 6-7 is that it provides for self-storage of the accessory unit. This is important, especially in the case of flash units. because flash units cannot — as a rule — remain mounted on the camera (and thus be "stored" in this way) for daylight exposures. The reason is that the mounting of a flash unit on the camera usually automatically operates a diaphragm-setting device and sets the shutter for a flash-exposure time. Since neither of these will be correct for daylight exposures, the flash unit must be removed from the camera and, in FIGS. 6-7, it will then be "stored" by the camera strap.

While the invention has been illustrated and described as embodied in an electronic flash unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An accessory unit for use with a photographic apparatus, comprising a housing; means for connecting said housing to a photographic apparatus; and at least one slot-shaped passage in said housing for passage therethrough of a camera strap associated with the photographic apparatus.

2. An accessory unit for use with a photographic apparatus, comprising a housing; means for connecting said housing to a photographic apparatus; and at least one slot-shaped passage in said housing for passage therethrough of a film sheet which is to be ejected from the photographic apparatus.

3. An accessory unit for use with a photographic apparatus of the self-developing type, comprising a housing; means for connecting said housing to a photographic apparatus, and at least one aperture in said housing for passage therethrough of a part associated with the photographic apparatus, the part being an exposed self-developing film sheet which is ejected from the photographic apparatus in a predetermined path, and said aperture being a slot-shaped passage which is aligned with said path and dimensioned to receive the ejected film sheet.

4. An accessory unit as defined in claim 3, said housing further comprising means for storing a plurality of ejected exposed film sheets.

5. An accessory unit as defined in claim 3, wherein said passage has a first section extending through said housing, and a second section laterally of and open to said first section and adapted to store a plurality of exposed ejected film sheets; and further comprising means for deflecting the film sheets into said second section upon their ejection from the photographic apparatus and entry into said first section.

6. An accessory unit as defined in claim 5, wherein said means comprises at least one deflecting spring in said passage.

7. An accessory unit as defined in claim 6, wherein said passage has two walls located at opposite sides of the path of travel of the ejected film sheets and delimiting said first and second sections, respectively, said at least one deflecting spring being mounted adjacent the wall delimiting said first section; and further comprising a friction material on the other of said walls and arranged to be engaged by a film sheet located in said second section.

8. An accessory unit as defined in claim 3, said unit being an electronic flash unit having a source of electrical energy and a flash tube with associated elements; and wherein said passage transverses said housing and divides the interior thereof into two sections one of which accommodates said source and the other of which accommodates said flash tube and associated elements.

9. An accessory unit as defined in claim 8, wherein said connecting means comprises first and second disengageable retaining means which are spaced from one another on said housing.

10. An accessory unit as defined in claim 9, wherein one of said retaining means comprises a magnetic portion.

11. An accessory unit for use with a photographic apparatus of the self-developing type, comprising a housing; means for connecting said housing to a photographic apparatus; and at least one aperture in said housing for passage therethrough of a part associated with the photographic apparatus, the part being an exposed self-developing film sheet which is ejected from the photographic apparatus in a predetermined path, and said aperture being a slot-shaped passage which is aligned with said path and dimensioned to receive the ejected film sheet for travel of the same through said housing; and further comprising a slot-shaped storage recess in said housing spaced from and parallel to said passage and adapted to receive and store respective ejected film sheets.

12. An accessory unit for use with a photographic apparatus of the self-developing type, comprising a housing; means for connecting said housing to a photographic apparatus; and at least one aperture in said housing for passage therethrough of a part associated with the photographic apparatus, the part being an exposed self-developing film sheet which is ejected from the photographic apparatus in a predetermined path, and said aperture being a slot-shaped passage aligned with said path and dimensioned to receive the exposed film sheet for travel of the same through said housing; and further comprising a substantially frame-shaped receiver on said housing aligned with said passage for receiving the respective ejected film sheets travelling through said housing.

13. An accessory unit as defined in claim 12, said housing having recesses and said receiver having lateral upright portions which are slidably received in the respective recesses so that the receiver straddles an outlet of said passage; and further comprising cooperating guide portions in said recesses and on said upright portions and guiding said receiver for movement relative to said passage and housing.

14. An accessory unit as defined in claim 13, said guide portions being guide tracks in said recesses and pins provided on said upright portions and extending into said guide tracks and guiding said receiver for movement between a first position in which the respective film sheet is lodged in the receiver and still in part received in the passage, and another position in which the film sheet is withdrawn from the passage.

15. An accessory unit as defined in claim 14, said housing being provided with a storage slot laterally adjacent and parallel to said passage, the respective film sheets being deposited in said storage slot when said receiver is in said other position.

16. An accessory unit as defined in claim 15, wherein said receiver comprises means for retaining a respective film sheet therein.

17. An accessory unit as defined in claim 16, wherein said retaining means comprises retaining springs.

18. An accessory unit for use with a photographic apparatus of the self-developing type, comprising a housing; means for connecting said housing to a photographic apparatus; and at least one slot-shaped passage in said housing through which a camera strap of the photographic apparatus extends.

19. An accessory unit for use with a photographic apparatus of the self-developing type, comprising a housing; means for connecting said housing to a photographic apparatus; and at least one aperture in said housing for passage therethrough of a part associated with the photographic apparatus, said part being a retaining part for retaining the accessory unit adjacent said photographic apparatus upon disengagement of said connecting means, and said aperture being a passage which traverses said housing and through which said retaining part extends.

* * * * *